Jan. 31, 1956   H. L. KNIGHT   2,732,626
DEVICE FOR CHECKING WHEEL ALIGNMENT
Filed Aug. 16, 1952   2 Sheets-Sheet 1
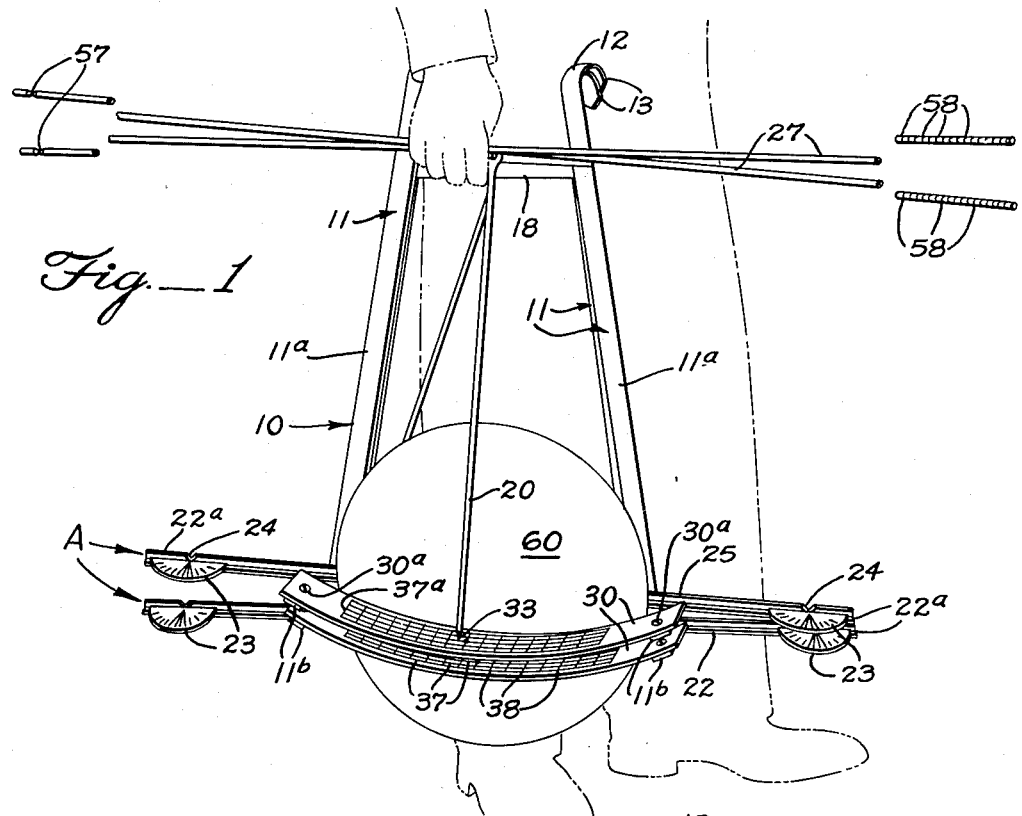
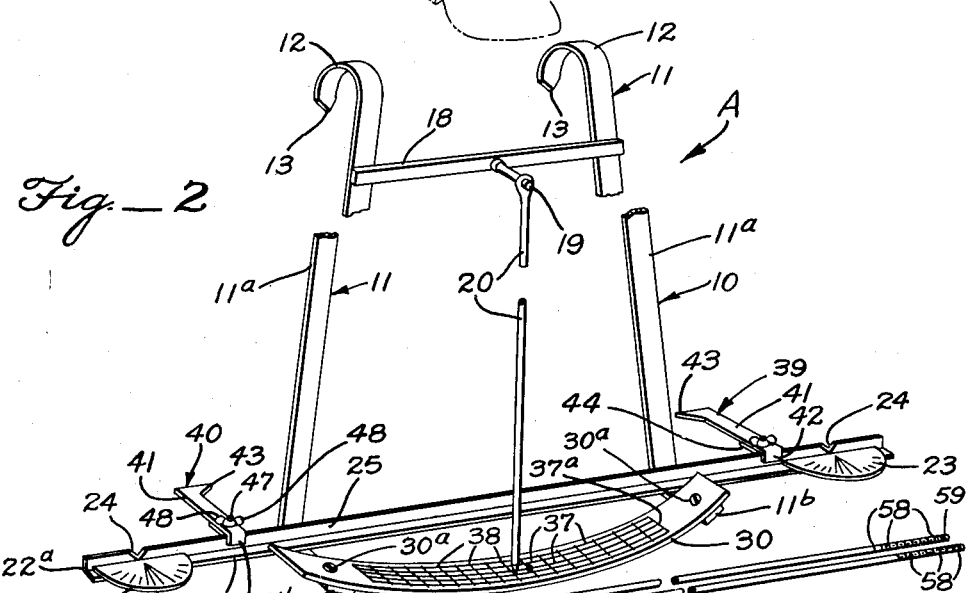
INVENTOR.
Harry L. Knight
BY Hansen & Lane
His Attorneys

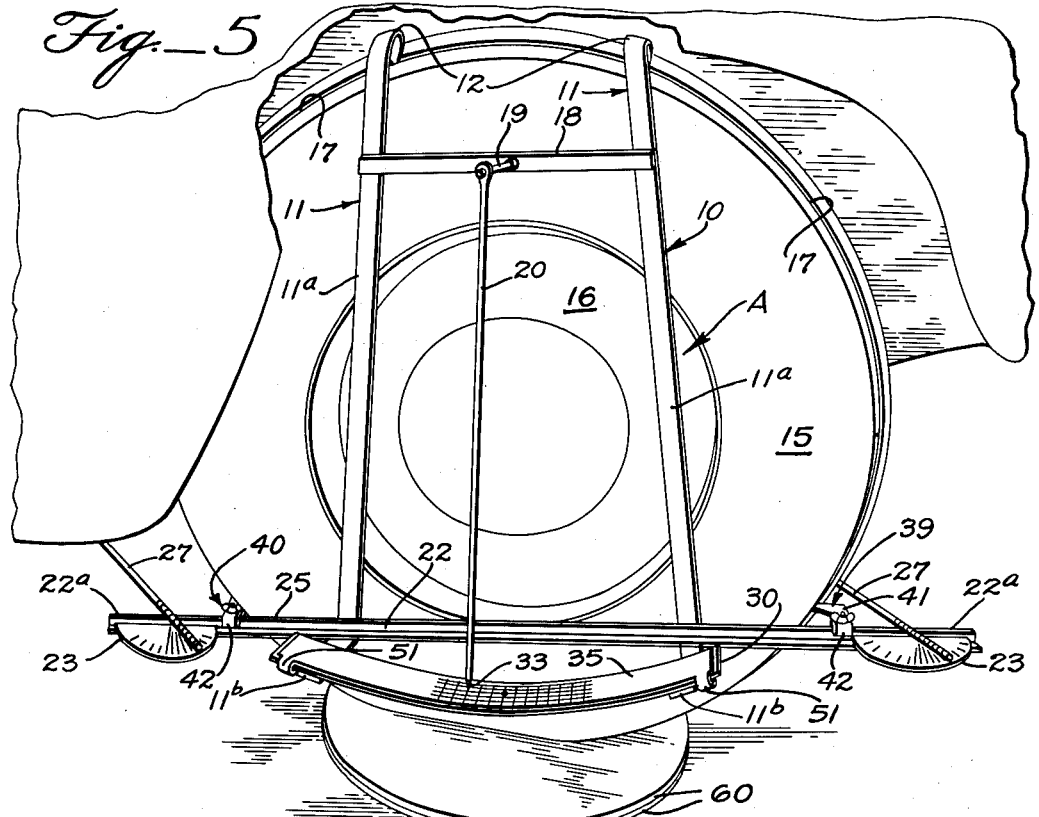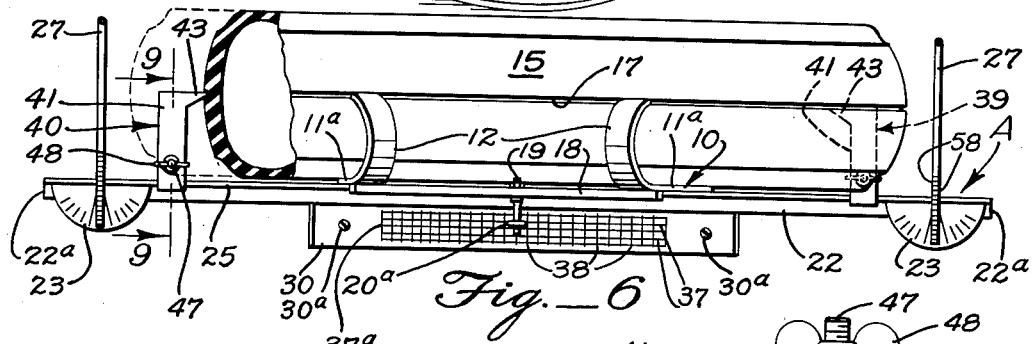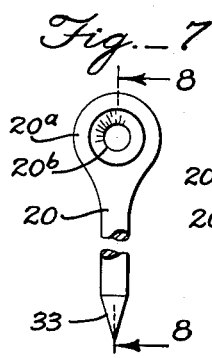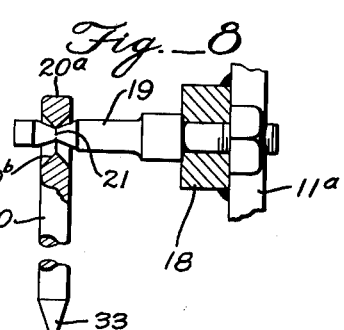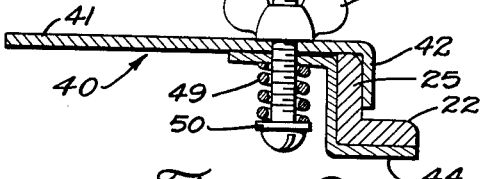
Jan. 31, 1956 H. L. KNIGHT 2,732,626
DEVICE FOR CHECKING WHEEL ALIGNMENT
Filed Aug. 16, 1952 2 Sheets-Sheet 2
INVENTOR.
Harry L. Knight
BY Hansen & Lane
His Attorneys United States Patent Office 2,732,626
Patented Jan. 31, 1956

2,732,626
DEVICE FOR CHECKING WHEEL ALIGNMENT

Harry L. Knight, San Jose, Calif.

Application August 16, 1952, Serial No. 304,721

3 Claims. (Cl. 33—203.2)

This invention relates to wheel aligning equipment and pertains more particularly to apparatus for use in checking the caster, camber and kingpin inclination of wheels of automotive vehicles.

Numerous types of apparatus have been evolved in the past for checking the alignment characteristics of the front wheels of an automobile so that the vehicle will ride well and steer easily. Many of these wheel aligning devices are large and cumbersome. Others, which are small, frequently are incapable of performing properly the several functions necessary for checking the alignment and other important characteristics of the wheels.

The present invention contemplates the provision of simple, compact and easily transportable apparatus for checking the alignment and other characteristics of the front wheels of an automobile.

The invention also provides apparatus which can easily be mounted in properly adjusted position on the front wheel of an automobile, and which in such position will be capable of testing various factors pertinent to a proper adjustment of the wheels.

It also is an object of the invention to provide apparatus which may readily be mounted on the dirigible wheels of an automobile and which incorporates transversely extending members whereby the caster, camber, toe-out, toe-in and kingpin inclination of the wheels may be easily and quickly checked.

It is a further object of the invention to provide front wheel aligning apparatus incorporating wheel support members which are of minimum thickness and which permit easy turning or limited transverse movement of the wheels when supported thereon.

The invention also provides light, rugged, convenient, easily transported wheel checking apparatus and incorporates the feature of a quickly attachable and removable clip-on type of gauge for use with a specific type or model of automobile.

These and other objects and advantages of the invention will become apparent from the following description and accompanying drawings, in which:

Fig. 1 is a perspective view of apparatus embodying the present invention as it appears when being transported, intermediate portions of a pair of toe-in checking rods being broken away.

Fig. 2 is a perspective view of a portion of the apparatus shown in Fig. 1 for mounting on one front wheel of an automobile, portions being broken away.

Fig. 3 is a view in perspective of a pair of cross rods adapted to be mounted transversely from one portion of the apparatus to the other when assembled on the front wheels of an automobile, intermediate portions of the rods being broken away.

Fig. 4 is a perspective view of an auxiliary gauge plate constructed and arranged to be mounted on a basic gauge plate of the apparatus shown in Fig. 2.

Fig. 5 is a perspective view of a front wheel of an automobile with alignment checking apparatus embodying the present invention mounted thereon, the wheel being turned to one angularly adjusted position, a portion of a front fender being broken away.

Fig. 6 is a plan view of the wheel assembly shown in Fig. 5, portions being broken away.

Fig. 7 is a fragmentary front elevational view of the upper and lower end portions of the pendulum pointer.

Fig. 8 is a fragmentary sectional view taken along line 8—8 of Fig. 7, and includes also the pendulum supporting post and a portion of one wheel mounted frame.

Fig. 9 is an enlarged sectional view taken on line 9—9 of Fig. 6.

For measuring various characteristics which affect steering and tire wear of an automobile, a pair of similar wheel checking assemblies A, A embodying the present invention are constructed for mounting one on each of the dirigible wheels of an automotive vehicle as shown in Fig. 5. Each of the assemblies A has a rigid frame 10 with a pair of generally upright side members 11, 11 of steel band. The members 11, 11 have straight central portions 11a, 11a which are disposed in a common plane, and converge slightly toward their upper ends. The upper portions of both of these side members 11, 11 are curved reversely upon themselves, as shown at 12, 12 (Figs. 1 and 2) and are pointed at their terminal ends 13. The pointed ends 13 of these reversely curved portions of the side members 11, 11 are offset inwardly from their straight upright portions 11a, 11a by a distance sufficient to allow the pointed ends 13, 13 to rest upon the tread of a tire 15 at its mid-plane of rotation when the frame is mounted on the tire as shown in Figs. 5 and 6.

The tire 15 is illustrated as having a tread groove 17 peripherally around the tire at its mid-plane. However, in the event that the tire itself is not provided with such a groove or other marking, or in the event that the tread groove if present, is not in the plane of wheel rotation, a line, not shown, defining a plane perpendicular to the axis of rotation of the wheel 16 may be inscribed on the tread of the tire in a well known manner by rotating the wheel while pressing a fixed marking point such as a pencil against the tread.

A bar 18 is welded to extend transversely across the upper portion of the frame 10 from one side frame member 11 to the other. A pendulum supporting pin 19 is mounted at the center of the upper transverse frame bar 18 to extend outwardly therefrom. An annular groove 21 of V-shaped cross section is provided around the pin 19 a predetermined distance outwardly from the plane defined by the straight portions 11a, 11a of the side frame members 11, 11. A pendulum pointer 20 has an eye 20a formed in its upper end, the eye being of a size to fit onto the pendulum support post 19. The inner marginal portion 20b of the eye 20a is beveled to provide a knife edge (Fig. 8) which rests in the bottom of the groove 21 to mount the pointer in free suspension on the post 19.

An angle bar 22 is welded to extend transversely across the side frame members 11, 11 near their lower ends. The end portions 22a, 22a of each angle bar 22 extend a substantial distance beyond the upright members 11, 11. Horizontal protractor plates 23, 23 of substantially semi-circular configuration are mounted one near each end of each angle member 22 for a purpose to be described later herein.

While one protractor plate would be sufficient to provide the necessary angular reading, it is preferred to provide one at each end of each frame to adapt the frame for use on either wheel as desired, and to permit the operator to take his reading from whichever end of the frame may be easier for him.

Notches 24, 24 are provided in the upper edge of the upright flange 25 of each angle bar 22, one of said notches being centered over the center of each protractor plate 23. The edges defining these notches 24, 24 are beveled to a knife edge and are disposed a sufficient distance from the center of each angle member 22 so that when a pair of cross rod 27, 27 (Figs. 1, 3, 5 and 6) are mounted in the notches 24, 24 as shown in Figs. 5 and 6 to extend transversely of the car from one frame 10 to the other, the rods will clear the tires 15 even when the front wheels 16 of the automobile are turned to the full limit of movement necessary for checking various characteristics thereof as described later herein.

The lower end portions 11b, 11b of the side frame members 11, 11 which extend below the angle bar 22 are bent outwardly substantially at right angles to their straight central portions 11a, 11a. The outwardly projecting lower end portions 11b, 11b are twisted slightly to be tangent to the curvature of an arcuately curved basic gauge plate 30 which is secured thereon by screws 30a (Fig. 5). The center of curvature of the gauge plate 30 is concentric with the suspension point of the pendulum pointer 20. The lower end 33 of the pointer 20 is pointed, and is at a height to clear the basic gauge plate 30 by a distance slightly greater than the thickness of an auxiliary gauge plate 35 (Figs. 4 and 5) to be described later herein.

The upper surface of the basic gauge plate 30 is marked off both lengthwise and transversely thereof in a grid pattern, with the lines of the grid accurately spaced apart and provided with suitable identifying indicia 37 and 38 (Figs. 2 and 6). Since the calibrations for setting the caster, camber, and kingpin inclination of an automobile frequently are given in degrees, these gauge lines 37 and 38 also preferably are spaced and designated in degrees of inclination of the frame 11 relative to the pointer 20 in its gravity maintained upright position.

A pair of tire engaging members 39 and 40 are slidably mounted one on each of the extending end portions 22a, 22a of the angle member 22. The slidable members 39 and 40 are similar to, but are reversed from, each other. Each comprises a tire engaging arm 41 (Figs. 6 and 9) of heavy sheet metal with one end portion 42 (Figs. 2 and 9) thereof bent downwardly at right angles to overlie the upright flange 25 of the angle bar 22. A laterally extending tire engaging pointed portion 43 is provided on the other end of each arm 41 from the portion 42. The arms 41 are secured to the angle bar 22 by Z-shaped clamp members 44 which fit against the inner and lower sides of the angle bar 22 and bear against the under side of the arm 41 as shown in Fig. 9.

The shank of a clamp screw 47 is inserted through registering holes provided therefor in the arm 41 and in the Z-clamp member 44. A wing nut 48 is threadedly mounted on the screw 47 to compress a coil spring 49 which surrounds the shank of the screw 47 and is interposed between a washer 50 resting against the head of the screw 47 and the Z-clamp member 44 to force the Z-clamp member 44 into resilient clamping engagement with the angle bar 22.

The laterally offset points 43, 43 are directed laterally inward toward each other so that they may be moved together into tire gripping position. The points 43, 43 are spaced inwardly from the plane defined by the central portions 11a, 11a of the upright side frame members 11, 11 the same distance as the points 13, 13 on the reversely bent upper ends of the side frame members 11, 11. Therefore, when all four of the points 13, 13 and 43, 43 are in engagement with the line 17 on the tire 15, the central portions 11a, 11a of the side frame members 11, 11 will lie in a plane parallel to the plane of tire rotation, and spaced outwardly clear of the side wall of the tire 15.

Each auxiliary gauge plate 35 preferably is of thin springy sheet material (Fig. 4) and is provided with a pair of spring clips 51, 51 near the ends thereof to clamp over the basic gauge plate 30 to conform thereto. The spring clips 51, 51 are spaced apart so as to fit closely outside the outwardly extending portions 11b, 11b of the side frame members 11, 11 to center the auxiliary gauge plate 35 accurately on the basic gauge plate 30.

Each auxiliary gauge plate 35 is intended to be used for calibrating and adjusting one particular model or type of automobile, which has specific requirements as to caster, camber and kingpin inclination. Therefore while the auxiliary gauge plate 35 is shown as being provided with a grid scale similarly to the basic gauge plate 30, each auxiliary gauge plate may be provided only with a plurality of different colored spots 52, 53 and 54 properly located to indicate the correct position of the pointer 20 for each of the several checks to be made. Thus, for example, the central spot 52 may be used to indicate the required position of the pointer when the correct amount of camber is provided, and the dots 53 and 54 may indicate the required position of the pointer when the wheels are turned to a predetermined angular position and the proper amount of caster and kingpin inclination are provided. Thus, by selecting the proper auxiliary gauge plate 35, the adjustment of a particular make or model of automobile for which said plate is calibrated will be greatly facilitated.

Each cross rod 27 has a rather deep annular groove 57 (Fig. 3) around one end thereof, and also has a plurality of very light gauge lines 58 scribed around the other end thereof. The annular groove 57 is of sufficient depth to ride in a notch 24 in the angle bar 22 of one of the frames 10 to retain the rod 27 against axial movement relative to the frame, while at the same time permitting limited angular movement of the angle member 22 relative to the rod. The gauge lines 58, however, are sufficiently lightly inscribed to allow free axial sliding movement of the rods relative to the angle members 22. Usual marking indicia 59 (Fig. 3) is provided to indicate the axial distance of various gauge lines 58 from the center of the annular groove 57 at the other end of the rod 27.

For supporting the front wheels 16 of the automobile in such a manner that they may be turned easily from side to side in a well known manner necessary for testing caster and kingpin inclination of the wheels, two pairs of wheel supporting discs 60, 60 are provided. These discs are similar to each other and are sandwiched together in pairs with a thin layer of heavy grease such as cup grease between the discs of each pair thereof.

Upon using the discs 60 for the first time after being lubricated, the weight of the automobile resting on the uppermost one of each pair thereof will force some grease out around the peripheries of the discs. This extruded grease can be easily wiped off, and thereafter no further difficulty is encountered from this source until regreasing is required, since the grease tends to remain in place between the discs. This grease also acts to exclude air from the inner surfaces of the discs of each pair, whereby the atmospheric air pressure on the outer surfaces of the discs tends to hold the discs together.

The discs 60, 60 preferably are of a size to fit in upright position into the space between the angle bar 22 and the basic gauge plate 30 as shown in Fig. 1, and to be supported by the outwardly extending lower end portions 11b, 11b of the side frame members 11, 11. When thus mounted, the discs hold the two assemblies A, A together in nested relation as a unit, and make the entire apparatus easy to transport from one job to another in the manner illustrated in Fig. 1.

In using the illustrated form of the invention, after insuring that the tires are provided with a suitable tread groove 17 or other inscribed line in the plane of wheel rotation as described previously herein, the two pairs of grease-sandwiched metal discs 60, 60 are placed on the floor with one pair thereof just ahead of each front wheel 16 of the automobile to be checked. The automobile then is rolled ahead to bring the front wheels 16 in substantially centered position onto the uppermost disc 60 of each pair thereof.

With the front wheels thus supported on the discs 60, 60 the wheels 16 are turned to substantially their straight ahead position, and the frames 10, 10 are mounted one on each of the front tires 15 with the points 13, 13 on the ends of the reversely curved upper end portions of the side frame members 11, 11 resting on the tread of the tire 15 at the groove 17 or other plane-of-wheel-rotation mark provided as described previously herein. With the pointer 20 suspended from the post 19 as shown in Fig. 5, each frame 10 then is adjusted forwardly or rearwardly on the tire, with the points 13, 13 remaining on the groove or line 17, until the lower end of the pointer is directly over the center transverse gauge line 38 on the basic gauge plate 20.

The slidable pointed members 39 and 40 then are moved laterally inwardly on the angle member 22 to grip the tire 15 between them, the pointed inner ends 43 of these members also being positioned on the plane-of-rotation line 17 of the tire. Since, as described previously herein, the points 13, 13 and 43, 43 are all at equal distances from the plane defined by the frame portions 11a, 11a, when thus mounted, the straight portions 11a, 11a of the frame members 11, 11 and the angle members 22, 22 will be parallel to the plane of wheel rotation defined by the tread mark 17.

After thus mounting the frames 10, 10, the cross rods 27, 27 are mounted in the notches 24, 24 in the longitudinally extending angle members 22, 22 to extend transversely across from one frame 10 to the other. Each rod 22 is positioned with its annular anchoring groove 57 resting in a V-shaped notch 24 of the angle member 22 of one frame 10 to retain the rod against axial displacement relative to that particular frame, and its scale lines 58 resting on the V-shaped notch 24 of the opposite frame 10, as shown in Fig. 5.

The end of each rod bearing the scale lines 58 thereon extends over the protractor scale 23 therebeneath, and serves as a pointer to indicate the angular position of the angle member 22 upon which the protractor scale is mounted relative to the rod 27. By means of the protractor thus provided the angle members 22, and thereby the wheels upon which they are mounted, are turned to their straight ahead position.

Since, as mentioned previously herein, the angle members 22, 22 are parallel to the plane of rotation of the respective wheels upon which they are mounted, if the sharpened upper edges defining the notches 24, 24 subtend portions of equal length on both rods, as indicated by the scale lines 58 on the rods, such a reading will indicate that the wheels have neither toe-out nor toe-in. If the portion of the front rod 27 subtended by the angle bars 22, 22 is longer than the portion of the rear rod 27 so subtended, it indicates that the wheels toe out by an amount indicated by the difference in length of the subtended portions of the two rods. A toe-in condition will, of course, be indicated when the subtended portion of the front rod is shorter than that of the rear rod.

Camber is checked with the wheels in their straight ahead position. A predetermined one 37a of the longitudinally extending scale lines 37 on the basic gauge plate 30 is provided at the same distance from the plane defined by the upright frame portions 11a, 11a as the annular groove 21 in the pointer support post 19. When the pointer is over this line 37a, it indicates that the plane of wheel rotation is vertical, or, in other words, has zero camber.

Positive camber is indicated when the lower end 33 of the pointer is disposed outwardly of the zero line 37a, and negative camber when the pointer is disposed inwardly of this zero line.

For checking caster and kingpin inclination, the front wheels 16 are first turned in either direction to a predetermined angular position, for example, 20° from a straight ahead position. The angular amount of wheel turn is indicated by the projecting end portions of the cross rods 27, 27 as described previously herein. With the wheels 16 thus turned to a required angular position, such as 20° from a straight ahead position, the amount of caster of the wheels is indicated by the distance the lower end of the pointer is moved outwardly or inwardly from its position over the scale when the wheels were in their straight ahead position. The amount of kingpin inclination is indicated by the distance the lower end of the pointer moves forwardly or rearwardly from its position when the wheels were pointed straight ahead.

By mounting an auxiliary gauge plate 35 in registering position upon the basic gauge plate 30 as described previously herein, the adjustment of the caster, camber and kingpin inclination of the particular make or model for which the auxiliary gauge plate is calibrated is greatly simplified and facilitated. In such case, with the frames 10 and cross rods 27, 27 mounted on the wheels 16 as described previously herein, and the wheels 16 pointed straight ahead, the camber of each wheel is adjusted so as to center the lower end 33 of the pointer 20 over the central dot 52. The wheels 16 then may be turned a required angular distance in one direction, and the caster and kingpin inclination may be adjusted to center the pointer over the rear dot 53. The wheels then may be turned a similar angular distance in the opposite direction and the caster and kingpin inclination may be finely adjusted to center the point 33 of the pointer over the third spot 54. With this latter arrangement, the checking of the wheel alignment characteristics of an automobile is greatly simplified and facilitated, and the chance of error due to mis-reading a scale is practically eliminated.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims.

I claim:

1. Apparatus for measuring angular characteristics of the dirigible wheels of an automobile comprising a pair of rigid frames, each having a pair of upright members disposed in a common plane, and a length of subtend portions of an automobile tire when placed against a side wall thereof, a pair of support hooks mounted on each frame to engage a tire tread, a horizontal member mounted across the lower ends of each pair of upright members to extend forwardly and rearwardly beyond a tire when the frame is mounted thereon, a pair of pointed tire engaging members slidably mounted on each horizontal frame member, said tire engaging members being slidably adjustable to engage the tire and support the upright members parallel to a plane of tire rotation, a rod supporting notch adjacent each end of the forwardly and rearwardly extending portion of each horizontal frame member, a pair of rods of a diameter to fit into said notches for support therein, and of a length to extend from one horizontal frame member to the other when said frames are mounted on a pair of dirigible wheels of an automobile, said rods each being freely slidable relative to one of said frames at one end of said rods and being grooved at the other end thereof for interengagement with the other of said frames marginally of the notches therein to retain said rods against axial displacement while leaving them free for turning movement relative to both frames.

2. Apparatus for measuring angular characteristics of the dirigible wheels of an automobile comprising a pair of frames constructed and arranged for mounting one on the outer side of each dirigible wheel in predetermined relation to the plane of rotation of the wheel upon which it is mounted, a pair of upright frame members on each frame, a reversely bent upper end portion on each upright frame member to rest on a tire tread and support the frame on a wheel, a pendulum support mounted on each frame to extend outwardly therefrom, a pendulum pivoted to depend from each of said supports, a rod support mounted on each frame and extending forwardly and rearwardly therefrom a sufficient distance to clear a tire on which the frame is mounted, a pair of rods for seating on said supports to extend transversely from one of said frames to the other with one rod ahead of and the other rod behind a pair of wheels upon which the frames are mounted, angle indicating means mounted on said support for indicating the angle of each rod to its support, an outwardly bent lower end portion on each upright frame member, a gauge plate curved concentrically with the pendulum pivot and mounted on the outwardly bent lower end portions of said upright frame members, and spaced outwardly from the upright frame members, indicia on said gauge plate to register with said pendulum in a predetermined angle of tilt to said frame relative to said pendulum, said frames being constructed for nesting interengagement with each other, with the outwardly bent lower end portions of the upright members and the curved gauge plates in superposed position, wheel supporting disk means constructed and arranged for supporting the dirigible wheels of an automobile for turning movement thereon, said disk means being insertible between the upright frame members and the gauge plates and being of a diameter greater than the distance separating said outwardly bent lower end portions, the disks being of a combined thickness less than the distance separating the gauge plates from their frames for insertion of the disks between the gauge plates and the frames and supported on the uppermost of said outwardly bent lower end portions with the frames in nested relation to secure the frames against separation.

3. Apparatus for measuring angular characteristics of the dirigible wheels of an automobile comprising a pair of frames constructed and arranged for mounting one on the tire of each of a pair of such dirigible wheels in predetermined relation to the plane of wheel rotation, portions of each frame extending forwardly and rearwardly of its wheel in equally spaced relation to the plane of wheel rotation, a rod support on each of said forwardly and rearwardly extending frame portions, a protractor mounted centrally below each rod support on one of said frames, and a pair of rods for seating on said supports to extend transversely from one of said frames to the other, said supports being located a sufficient distance from the wheel to position the rods clear of the wheel within predetermined turning limits of the wheel, one end portion each of said rods being smooth for free relative slidability on its support, the other end of said rod being notched for anchored engagement with its support against axial displacement, the rods being free for turning relative to their supports, the angle of turning of each rod being indicated on the protractors.

References Cited in the file of this patent

UNITED STATES PATENTS

| | | |
|---|---|---|
| 894,933 | Benson | Aug. 4, 1908 |
| 1,097,925 | Johnson | May 26, 1914 |
| 1,644,111 | Dearborn | Oct. 4, 1927 |
| 1,980,487 | Klauder | Nov. 13, 1934 |
| 2,160,226 | Phillips | May 30, 1939 |
| 2,285,965 | Halstead | June 9, 1942 |
| 2,292,968 | Peters | Aug. 11, 1942 |
| 2,532,593 | Bender et al. | Dec. 5, 1950 |
| 2,624,123 | Wilkerson | Jan. 6, 1953 |
| 2,627,123 | Taber | Feb. 3, 1953 |

FOREIGN PATENTS

| | | |
|---|---|---|
| 130,331 | Australia | Nov. 29, 1948 |